United States Patent [19]
van den Berg

[11] Patent Number: 5,704,311
[45] Date of Patent: Jan. 6, 1998

[54] METHOD AND APPARATUS FOR AUTOMATICALLY MILKING ANIMALS

[75] Inventor: Karel van den Berg, Bleskensgraaf, Netherlands

[73] Assignee: Maasland N.V., Maasland, Netherlands

[21] Appl. No.: 421,794

[22] Filed: Apr. 14, 1995

[30] Foreign Application Priority Data

| Apr. 14, 1994 | [NL] | Netherlands | 9400589 |
| Oct. 27, 1994 | [NL] | Netherlands | 9401785 |
| Feb. 24, 1995 | [NL] | Netherlands | 9500362 |

[51] Int. Cl.$^6$ .................... A01J 5/013; A01K 1/12
[52] U.S. Cl. .................... 119/14.02; 119/14.03; 119/14.08; 119/520; 119/840
[58] Field of Search ............. 119/14.02, 14.03, 119/14.08, 14.15, 840, 520

[56] References Cited

U.S. PATENT DOCUMENTS

| 1,863,603 | 6/1932 | Marshall, Jr. | 119/14.03 |
| 2,269,012 | 1/1942 | De Carli | 119/14.03 |
| 2,512,094 | 6/1950 | Duncan . | |
| 2,617,382 | 5/1952 | Duncan . | |
| 2,617,383 | 11/1952 | Duncan . | |
| 2,737,923 | 3/1956 | Duncan . | |
| 2,740,377 | 4/1956 | Duncan . | |
| 4,532,982 | 8/1985 | Kuzara | 119/51.02 |
| 4,716,180 | 12/1987 | Fetty et al. | 514/782 |
| 5,054,425 | 10/1991 | Grimm et al. | 119/14.02 |
| 5,152,246 | 10/1992 | Wakui et al. | 119/14.15 |
| 5,195,455 | 3/1993 | Van Der Lely et al. | 119/14.03 |
| 5,310,565 | 5/1994 | Geyer | 426/271 |

FOREIGN PATENT DOCUMENTS

| 0 137 367 | 4/1985 | European Pat. Off. . | |
| 0320496 | 6/1989 | European Pat. Off. | 119/14.08 |
| 0332231 | 9/1989 | European Pat. Off. | 119/14.08 |
| 385539 | 9/1990 | European Pat. Off. | 119/14.03 |
| 0 534 565 | 3/1993 | European Pat. Off. . | |
| 0551959 | 7/1993 | European Pat. Off. | 119/14.08 |
| 566201 | 10/1993 | European Pat. Off. | 119/14.08 |
| 2427579 | 1/1975 | Germany | 119/14.08 |
| 8602505 | 5/1988 | Netherlands . | |

*Primary Examiner*—Todd E. Manahan
*Attorney, Agent, or Firm*—Penrose Lucas Albright

[57] ABSTRACT

In a method of automatically milking animals, such as cows, the milk obtained from each udder quarter is discharged through separate milk lines to a collector element. When the milk flow from one or more udder quarters has decreased to less than a threshold value, the vacuum in the teat cup or cups connected to the udder quarter is broken. When mastitis has been detected in an udder quarter and after the milk flow originating therefrom, possibly combined with that from one or more other udder quarters, has decreased to below said threshold value, the udder quarter or quarters involved are automatically stripped, either during a predetermined period of time or for receiving a predetermined quantity of milk, or until the milk flow has decreased to less than a second threshold value which is lower than said first threshold value.

43 Claims, 3 Drawing Sheets

METHOD AND APPARATUS FOR AUTOMATICALLY MILKING ANIMALS

FIELD OF THE INVENTION

The present invention relates to a method of automatically milking animals, such as cows, in which the animals are milked by one or more milking robots, and in which milk obtained from an udder quarter is discharged to a collector element, such as a milk claw or a milk jar.

BACKGROUND AND SUMMARY OF THE INVENTION

Such constructions are known. But they may not always be satisfactory for the prevention of illnesses such as mastitis. It is thus an object of the present invention to prevent mastitis and other illnesses to the extent possible. To that end, if in an early stage an illness has been detected in an adder quarter and the milk flow has fallen to below a defined threshold value (D1), this udder quarter is automatically stripped. If so desired, this threshold value (D1) may be different for various animals.

When the milk flow has fallen to below a predetermined threshold value, it is considered that the milking operation should cease; the udder quarter is assumed to have been more or less stripped at much as it should be. More specifically, to prevent mastitis, it is important for the milking operation to be stopped when the milk flow has become quite weak. If then the milking operation is continued, the teats may be irritated to such an extent that the risk of mastitis is increased. However, once mastitis has been detected in an udder quarter, it may be of importance nevertheless to continue milking. Therefore, once mastitis has been detected in an udder quarter and after the milk flow originating therefrom, possibly combined with that from one or more other udder quarters, has fallen to below aforesaid threshold value (D1), the udder quarter or udder quarters involved are automatically stripped.

In a first method, when mastitis has been detected in an udder quarter and after the milk flow therefrom has decreased to less than said threshold value (D1), this udder quarter is stripped further for a defined time interval. In a second alternative method, when mastitis has been detected in an udder quarter and after the milk flow originating therefrom decreases to below said threshold value (D1), the udder quarter is stripped further until an additional, predetermined quantity of milk has been withdrawn from this udder quarter. In yet another feasible method, when mastitis has been detected in an udder quarter and after the milk flow originating therefrom decreases to below said threshold value (D1), the udder quarter is stripped further until the milk flow from this udder quarter falls below a second threshold value (D2), lower than the first-mentioned threshold value (D1). In this method, the second threshold value (D2) may depend on the extent to which mastitis has been detected. Another option is to continue the milking operation until all or substantially all the milk has been withdrawn from an udder quarter affected by mastitis. To discontinue the stripping operation it is sufficient to reduce the degree of vacuum in the relevant teat cup, it not being absolutely necessary for the teat cup to be disconnected or removed at the same time. The question as to which method is to be used, depends to a significant extent on whether the teat cups are individually disconnectable or can only be disconnected and removed collectively. In addition, it should be noted that the above method can be applied to each udder quarter separately or in pair, for example the two front udder quarters and the two rear udder quarters. The two front, and also the two rear udder quarters are comparable to each other to a significant extent in respect to their milk yield. It is possible that mastitis is detected in the joint milk flow from the two front or from the two rear udder quarters or from both. In this situation, after the milk flow originating from the two front or rear udder quarters decreases to below a first threshold value, the two udder quarters continue to be stripped further, although mastitis may have occurred in only one of the two udder quarters.

According to the invention, a mastitis sensor may be incorporated in each of the milk lines, which causes a signal M to be derived in a computer, indicating that mastitis has occurred in a given udder quarter, while furthermore, with the aid of this signal M, a threshold value for the milk flow in the milk line connected to the udder quarter affected by mastitis is derived in the computer in accordance with the Booleam expression $D = D1.\overline{M} + D2.M$. More in particular, a milk flow sensor is incorporated in each of the milk lines, each milk flow sensor supplying to the computer a signal S, indicating the quantity of the milk flow, the relevant milk line under a teat cup being closed as soon as the computer has determined that the milk flow S has decreased to less than the threshold value D. The aforementioned methods may, of course, also be combined. This combined method is then characterized in that, after mastitis has been detected in an udder quarter and after the milk flow originating therefrom has decreased to less than the said threshold value (D1), this udder quarter, depending on the progression of the milk yield versue time, is either stripped further during a predetermined time interval, or is stripped further until the milk flow from this udder quarter has fallen to below a second threshold value (D2), the second threshold value (D2) being lower than the first-mentioned threshold value (D1), or is stripped further until an additional, predetermined quantity of milk has been taken from this udder quarter.

A mastitis detection which has proved to be reliable in actual practice, is obtained when milk conductivity sensors are used as mastitis sensors. The milk conductivity sensed in a milk line is compared to the milk conductivity, updated in a computer on the basis of a progressive weighted or non-weighted average of previous milking turns, of a relevant animal on the basis of this comparison it is ascertained whether the relevant udder quarter, after the milk flow originating therefrom has decreased to less than said first threshold value (D1), should or should not be stripped further. The decision of whether or not mastitis is assumed to be present, is animal-dependent; the milk conductivity last measured is compared to the historical data previously recorded in the form of a progressive, weighted or non-weighted average. On the basis of the said comparison, the computer can produce an attention signal, which can be displayed on a display screen and/or be printed, this attention signal indicating to what extent the last-measured milk conductivity exceeds that ascertained in the computer. On the basis of this attention signal, by means of a command manually entered into the computer or by means of a command already previously recorded in the computer, a relevant udder quarter can be stripped further or be stripped further at least during the subsequent milking turn as soon as it is learned that the milk flow in the relevant milk line has decreased to less than the first-mentioned threshold value (D1). In practice, this will mean that on the basis of the attention signal the farmer can make the decision further to strip the relevant udder quarter in, for example the subsequent milking turn, although such a command may have already been stored in the computer, so that at the proper instant the relevant udder quarter can be stripped still further.

Instead of milk conductivity sensors, it is alternatively possible to incorporate filters in the milk lines, the mastitis detection then being based on resistance measurements. The filter has a higher resistance to the milk flow passing therethrough when this flow has been infected by mastitis and consequently is somewhat cloudy.

Instead of stripping a mastitis-affected udder quarter further than is usually customary, a mastitis in its initial stage can also be counteracted by milking the animals more frequently. Hence, the invention also relates to a method of automatically milking animals, such as cows, in which the milk obtained per udder quarter is discharged through separate milk lines to a collector element, such as, for example, a milk claw or a milk jar, and in which, when the milk flow originating from one or more udder quarters has fallen to below a threshold value (D1), the degree of vacuum in the teat cup or cups connected to the udder quarter or quarters is reduced or eliminated, which method is then characterized in that, when mastitis has been detected in an udder quarter and after the milk flow originating therefrom, possibly combined with that from one or more other udder quarters, has decreased to below said threshold value (D1), the relevant animal is admitted a more times per 24 hours than other animals into the area arranged for automatic milking.

When mastitis has been diagnosed for an animal, it may be important to prevent the animal, after having been milked, from mingling with the other animals. Therefore, according to the invention, it is possible that, after mastitis has been diagnosed in an udder quarter, the relevant animal is transferred to an isolation area contiguous to the area arranged for automatic milking. This isolation area may also be used are an area in which the animals can be isolated for other reasons. The isolation area may thus be used to separate animals to be inseminated or animals whose hoofs must be clipped.

The isolation area can also serve for collecting animals which report to the milking robot to be milked again too early after their previous milking turns. When these animals have to wait for some length of time, it would not be wise to send them back to the pasture: it might then be too long before they would report again to the milking robot, so that the time elapsed between successive milking turns would be too long. The invention, therefore, further relates to an apparatus for automatically milking animals, including an area comprising a milking robot and arranged for automatic milking, characterized in that, contiguous thereto, there is provided an isolation area in which animals, which report to the milking robot at such an instant that it must be assumed that the quantity of milk to be supplied by them will be less than a desired value, are detained until they can indeed be milked. The isolation area can then be in connection with a pasture, so that animals can be admitted from the pasture into the isolation area, optionally via the area arranged for automatic milking, and animals which need not be detained for specific reasons can go from the isolation area to the pasture.

Among the animals to be milked there may be "animals which are difficult to be milked automatically"; they may be animals having only three teats or animals with very unequal teat heights with such animals, it may happen that the milking robot does not succeed, or even cannot succeed—also after repeated efforts—in connecting the teat cups to the teats of the animals. A signal indicating this is usually provided, so that the farmer can then act to milk the animal, if due, himself. Since, however, the milking robot may be in operation for the full 24 hours, the farmer might find himself alerted at any moment during these 24 hours. According to the invention, this inconvenience to the farmer is avoided when the animals which are difficult to be milked automatically are detained in the isolation area for predetermined periods of time, such as nighttime, during which access to the milking area is to be denied to them. More in particular, the invention, therefore, also relates to an apparatus for automatically milking animals, including an area comprising a milking robot and arranged for automatic milking, characterized in that animals which are difficult to be milked automatically, such as those having only three teats, those having very unequal teat heights, etc., are denied access to the area arranged for automatic milking, for example, during the night, or are removed from this area without being milked if they had obtained access thereto in one way or another. More in particular, alarm means may be provided, with the aid of which it can be indicated that milking of the animal present in or at a milking compartment could not be accomplished because, for example, the milking robot cannot successfully connect the teat cups to the teats of the animal. Use of the alarm means can be avoided at least for animals which are difficult to be milked automatically during the periods of time that access to an area from which they can enter the milking compartment is denied to them.

According to the invention, the number of animals transferred from the milking area to the isolation area will be updated in the computer. The number of animals present in the isolation area can be updated both in the computer and in counting means provided for the purpose at or near the entrance and/or exit of the isolation area. When the animals enter the isolation area from the milking area, this can be recorded directly into the computer; when, however, the animals are guided by the farmer via a further door from the isolation area or predetermined animals are led therein, then the farmer can further update the number of animals present in the isolation area with the aid of the counting means. When the number of animals present in the isolation area exceeds a predetermined value, then the farmer may be warned.

Mastitis can not only be treated by further stripping of an udder quarter affected by mastitis and/or by more frequent milking of an animal, but also by rubbing an anti-mastitis ointment on at least the teat of the relevant udder quarter. The invention, therefore, also relates to a method of automatically milking animals, such as cows, characterized in that, when mastitis has been detected in an udder quarter, an anti-mastitis ointment is automatically applied, after milking, on at least the teat of the relevant udder quarter.

The invention does not only relate to a method, but also to an apparatus for automatically milking animals, in which the afore-described method can be applied. The apparatus then includes teat cups and a collector element, such as a mild claw or a milk jar, to which receives the milk obtained from each udder quarter through separate lines, and a mastitis sensor and a milk flow sensor incorporated in one or more of these lines and, in addition, means are present for breaking or reducing the vacuum in the teat cups and/or means for disconnecting the teat cups. The apparatus is then characterized in that there is present a computer, which, in response to signals coming from the milk flow sensor and the mastitis sensor, applies a control signal to the said vacuum breaking or reducing means, when the milk flow in a relevant milk line decreases to below a mastitis-depending threshold value or when a predetermined time interval has elapsed after this milk flow has decreased to less than a fixed or udder quarter-dependent threshold value. As a result, the vacuum in a relevant teat cup is broken or sufficiently reduced the teat cups for disconnecting. More specifically, when the milk flow sensors used are of the type in which the through-flow of a given quantity of milk is indicated by means of electrodes, it is, in accordance with the invention, important for the milk flow sensors to be provided in the milk lines near the connection of the milk lines to the collector element. The milk lines themselves then act as a kind of buffer, via which the milk obtained from the udder quarters is supplied in a pulsed mode. When at consecutive pulsed strokes less milk is fed through the line to a milk flow sensor, it takes a longer period of time before the volume between the two electrodes is filled with milk and the period of time between the signals supplied by the electrodes will increase. This period of time, which becomes longer towards the end of the milking operation, is a measure of the rate of milk flow. The predetermined threshold values then are in a direct relationship with the length of the time interval between consecutive signals produced by the electrodes.

Furthermore, according to the invention, a shut-off element for the milk lines connected to the teat cups may be provided under each of the teat cups, each of the shut-off elements closing a milk line after said control signal has been provided. Furthermore, according to the invention, a pulsator is usually provided for producing in each of the teat cups a pulsating vacuum, which in the relevant teat cup is broken after the said control signal has been applied, by admitting ambient pressure therein.

The afore-mentioned method can more in particular be applied in an advantageous manner in an above-described apparatus, which is not only arranged for automatic milking, but which is also provided with a milking robot for automatically connecting the teat cups to the teats of an animal to be milked and automatically disconnecting same, as soon as the milk flow in a given milk line has decreased to less than a mastitis-depending threshold value, preset in the computer, or as soon as a predetermined time interval has elapsed after the milk flow has decreased to below a fixed or udder quarter-depending threshold value. In this situation, the milking robot may comprise means for, when mastitis has been detected in an udder quarter after milking, automatically applying an anti-mastitis ointment on at least the teat of the relevant udder quarter.

According to the invention, the above-described apparatus may further include both an area arranged for automatic milking and an isolation area contiguous thereto, to which latter area the animals can be transferred for special reasons, such as because mastitis has been detected, or because the animals are to be inseminated, or because the hoofs of the animals must be clipped, etc. In or near this isolation area there may be arranged counting means, by means of which the number of animals present in the isolation area can be updated manually, more in particular when the animals are led into or from the isolation area via a separate passage. These counting means may be connected to a computer for a computerized updating of the number of animals present in the isolation area as indicated by the counting means, when the animals enter the isolation area from the milking area.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF THE PREFERRED EMBODIMENTS

Figure 1:
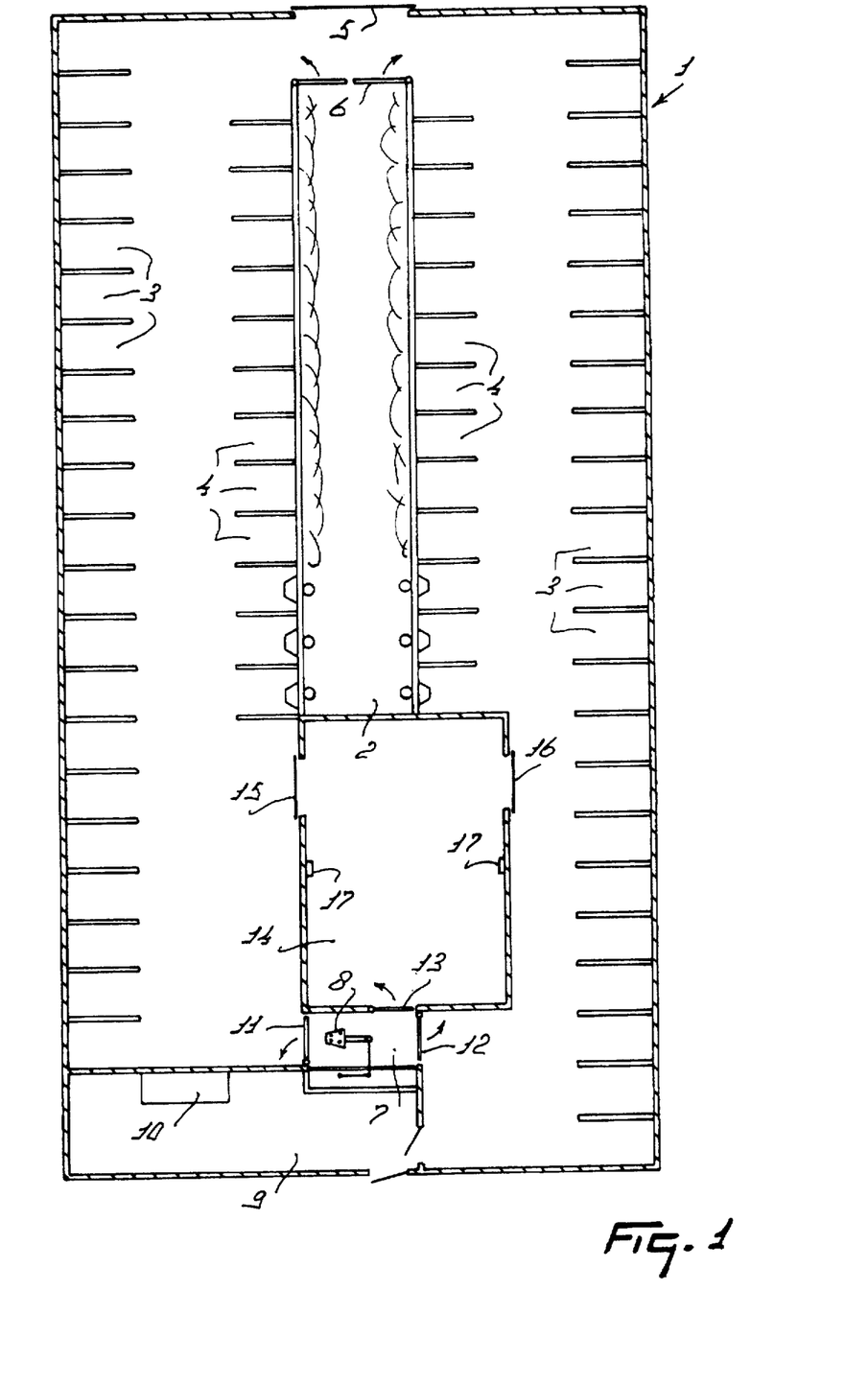
FIG. 1 illustrates a shed organization, in which the apparatus for automatically milking animals in accordance with the invention is accommodated.

FIG. 1 is a plan view of a shed or housing 1, in which a feeding area 2 is present which extends centrally in the longitudinal direction thereof. At both sides of feeding area 2, a plurality of cubicles 3 are located along substantially the overall length of housing 1 along the sides of its outer wall and, along the sides of feeding area 2 a plurality of feeding stations 4 located. Via doors 5 and 6 in shed 1, fodder in the form of hay can be transferred by means of a tractor driving into feeding passage 2 to feed channels and/or concentrate to feeding troughs for the feeding stations 4. Cubicles 3 and feeding stations 4 are arranged so that sufficient room remains for the animals to walk between the cubicles and the feeding stations, and so that they can move about and exercise to a sufficient extent and basically can walk around the shed. Near a shorter side of the shed is a milking area or compartment 7, in which a machine or apparatus for automatically milking animals is positioned. This milking machine includes a milking robot 8 for automatically connecting teat cups to the teats of an animal to be milked and subsequently disconnecting then. Between milking area 7 and the nearby side of shed 1 is a computer area 9, in which a computer 10 is located together with all the equipment that is part of the milking apparatus but is not disposed in milking area 7 proper. The milking compartment 7 has an entrance door 11 and two exit doors 12 and 13. The animals can enter the milking area from the exercise area via the door 11, whilst the animals can enter the exercise area again from the milking area via the door 12. As soon as an animal has entered the milking area from the exercise area or, via the exercise area, from the pasture, the animal's identity is ascertained in the customary manner. By means of the cow recognition system used therefor, assess is obtained to a data file present in the computer of the system for this animal. Recorded in this file inter alia is how much time has elapsed since her previous milking turn. From the subsequently established time differences between the moment when an animal enters the milking compartment, or at least reports at the milking compartment (in case the animal is identified prior to entering same), and the previous milking turn, an average value of these time differences can be determined. Preferably, this is done on the basis of a progressive average, based on each milking turn over say the last seven days. Furthermore the spreading in this average is determined. The said average value and the spreading therein are recorded in the memory file for the relevant animal and serve as a basis for a possible warning or placing the animal on an attention list, when an animal does not report in time at the milking compartment. When since the previous milking turn there has elapsed a period of time corresponding to the said average value plus a certain additional time determined by the said spreading without the animal having reported, then the animal must be brought in to be milked.

Next to milking area 7 there is an isolation area 14, which can be reached from the milking area via door 13. In addition, isolation area 14 is accessible via doors 15 and 16. In area 14, animals can be separated from the animals present in the exercise area of shed 1. This may be necessary because the animals have an udder shape that the teat cups cannot be connected automatically, because they are to be inseminated or because their hoofs are to be clipped, in which event the farmer can lead the animals via door 15 into isolation area 14, but also if mastitis has been detected in animals present in the milking area 7, those animals are then led from there via door 13 into isolation area 14 instead of into the exercise area of shed 1. The farmer can fetch animals from isolation area 14 via door 16. Using computer 10, which is further used for controlling the automatic milking procedure and the automatic connecting of the teat cups to the teats and disconnecting same therefrom, and also for performing all possible actions that are also of importance to the milking operation, the number of animals which are led from milking area 7 to isolation area 14 can be updated. When, however, the farmer himself leads animals into the isolation area via the door 15, or removes animals therefrom via the door 16, then the number of animals in the isolation area, as recorded in computer 10, will not correspond to the actual number. To prevent this error, counting means 17 are provided which are connected to computer 10. These counting means are preferably disposed near doors 15 and 16 and can be operated manually by the farmer. When the farmer leads an animal via one of doors 15 or 16 into the isolation area, then, by operating counting means 17, he can cause the number of animals indicated thereby to correspond to the actual number. Likewise, when he fetches an animal from isolation area 14 via one of the doors 15 or 16 the farmer can adjust, by operating the counting means, the number of animals present in the isolation area, so that, since the counting means 17 are connected to the computer 10, the correct number of animals present in the isolation area is updated at all times in computer 10 and, if so desired, can be displayed on a display screen provided on the counting means. When in the absence of the farmer too many animals are passed from milking area 7 to isolation area 14, an alarm can be triggered to warn the farmer that the number of animals in isolation area is too high.

Figure 3A:
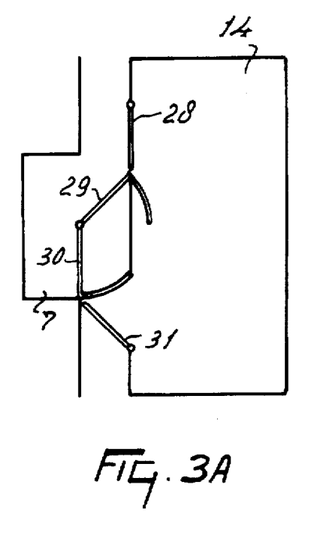
FIGS. 3A to 3E illustrate schematically positions of the various doors to and from the milking area and the isolation area in a specific embodiment.
Figure 3B:
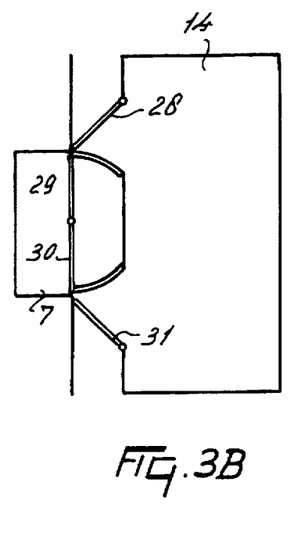
Figure 3C:
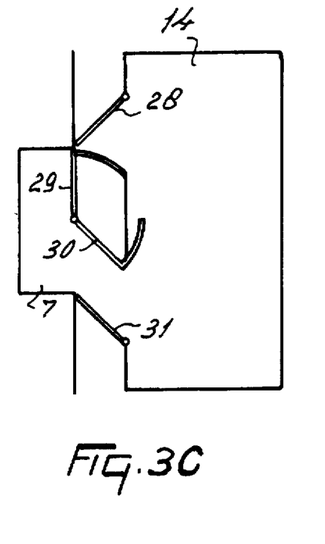
Figure 3D:
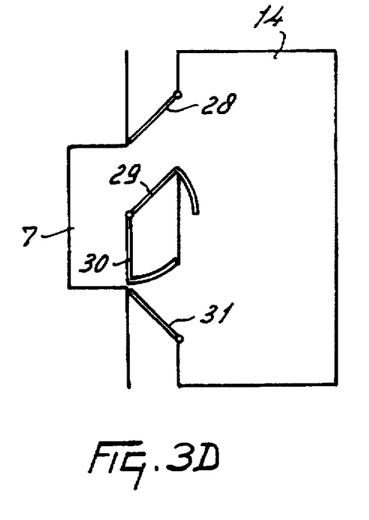
Figure 3E:
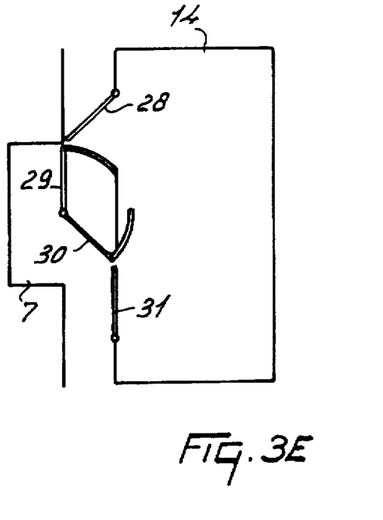

As has already been stated before, there may be present an isolation area for animals which have such an udder shape that the teat cups cannot be connected automatically. After these animals have been identified, they can be passed on to the isolation area, without the milking robot trying to connect the teat cups. Also animals, whose connection of the teat cups has failed even after repeated efforts, can be guided via the milking compartment to the isolation area, certainly during the so-called curfew times, such as during the night. The animals guided to the isolation area for the above reasons should be subsequently milked. For this purpose they are guided from the isolation area to the milking compartment, where the teat cups usually will have to be connected manually. To do this, the dispositions of various gates or doors into and from milking compartment 7 and isolation area 14 are represented in FIGS. 3A to 3E. In these Figures, the milking area is indicated again by reference numeral 7 and the isolation area by reference numeral 14. The entering and leaving of these areas is effected by means of, preferably computer-controlled, doors 28, 29, 30 and 31. In position of the doors as shown in FIG. 3A, an animal can enter the milking compartment 7 from the exercise area in the shed; doors 28 and 29 are subsequently closed (see FIG. 3B). When thereafter the connection of the teat cups fails or connection is not attempted due to the deviating udder shape, then door 30 is opened and the animal is guided to isolation area 14 (see FIG. 3C). Then door 30 is closed. When in this manner a certain number of non-automatically to be milked animals have been collected in the isolation area, then these will be admitted from isolation area 14 to the milking compartment in the presence of the farmer and at a moment to be decided by him. After the door 29 has opened (see FIG. 3D), an animal can enter the milking compartment from the isolation area, after which the door 29 is closed again, the animal is subsequently milked and dismissed from the milking compartment by opening doors 30 and 31 (see FIG. 3E) and guided to the exercise area of the shed. Then doors 30 and 31 close, while the door 29 is opened again in order to admit the next animal from the isolation area to the milking compartment.

Figure 2:
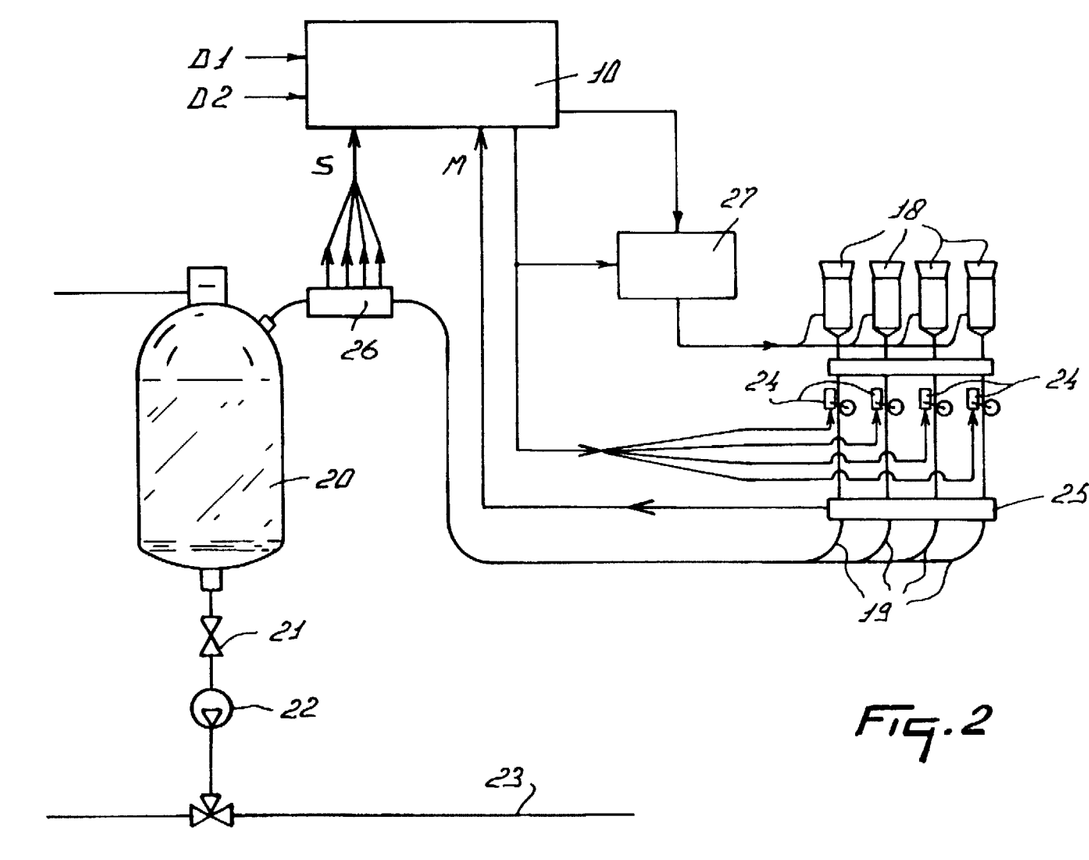
FIG. 2 illustrates schematically a portion of the apparatus for automatically milking animals.

The apparatus for automatically milking animals, which is partially and schematically shown in FIG. 2, includes teat cups 18 which are automatically connected to the teats of an animal to be milked by milking robot 8. Each of the milk lines 19 connected to teat cups 18 extends individually into a milk jar 20, from which, each time when a predetermined quantity of milk is received therein. The milk is pumped by means of a pump 22 via a shut-off device 21 into a line 23 leading to a milk tank (not shown). Under teat cups 18, each milk line 19 includes a shut-off device 24. Also a mastitis sensor 25 and a milk flow sensor 26 are incorporated in each of the milk lines 19. Milk flow sensors 26 are accommodated in milk lines 19 near the region where these milk lines end in the milk jar 20. FIG. 2 shows computer 10 which is also shown in FIG. 1. Signals S from individual milk flow sensors 25 are applied to this computer 10, each of these signals S being indicative of the milk flow in a relevant milk line 19. In addition, signals M supplied by each of the mastitis sensors are transmitted to computer 10. In the present embodiment, the mastitis sensors are milk conductivity sensors. The signals supplied by these sensors, which signals are a measure of the conductivity of the milk, are compared in the computer 10 to progressive, weighted or non-weighted average of the milk conductivity recorded during previous milking turns, whereupon, when the last-measured milk conductivity exceeds the progressive, weighted or non-weighted average to an excessive extent, an attention signal is displayed on display screen of the computer 10, on the basis of which signal the farmer can decide whether or not it is a matter of mastitis and if measures to counteract it must be taken. These data, and other data relevant to the milking of the animal or to her health, can not only be displayed on the display screen of the computer, but also be shown on attention lists to be printed out or even on a display screen to be arranged in the shed or elsewhere in the farm, so that the farmer can see the relevant data from a distance and at a single glance, without him having to strain his eyes on a computer display screen. By keying-in an affirmation in computer 10 a signal is received by computer 10 that it is indeed a matter of mastitis. This signal can, of course, also be produced automatically when the last-measured milk conductivity has exceeded the progressive, weighted or non-weighted average recorded in the computer by a predetermined extent. In computer 10, threshold values D1 and D2 may have been recorded in a program for the milk flow in the lines 19, or these threshold values may be entered via a keyboard. In the computer 10, a threshold value D is derived from the signal M and the threshold values D1 and D2, for which it holds that, as soon as the signal S from a milk flow sensor 26 has decreased to less than threshold value D, computer 10 produces a control signal. This control signal can be applied to a shut-off device 24 for closing the relevant milk line and for thereafter breaking the vacuum of the relevant teat cup and for optionally disconnecting the teat cup immediately thereafter. For the benefit of the milking operation there is present a pulsator 27, which is controlled by computer 10 and which produces a pulsating vacuum in each of the teat cups. After the said control signal has been applied, pulsations in the relevant teat cup to cease by admitting air at ambient pressure therein. The threshold value D, such as it is established in the computer 10, satisfies the Boolean expression $D=D1.\overline{M}+D2.M$. In other words, in computer 10 there is determined a mastitis-dependent threshold value for the milk flow in a milk line 19, and as soon as the milk flow has decreased to a level below the predetermined threshold value D, milking of the relevant udder quarter is to be stopped. Since the second threshold value, i.e. the threshold value which holds for the case when mastitis has been found in an udder quarter, is less than the first threshold value, the relevant udder quarter is milked for a longer period of time than would be the case when no mastitis was detected in an udder quarter.

Instead of the second threshold value D2 it is also possible to utilize a predetermined time interval, which starts after the milk flow in the relevant line has decreased to less than the threshold value D1, for stripping the udder quarter.

The invention is not limited to the embodiment described in the foregoing, but includes further modifications, insofar as they are within the scope of the accompanying claims.

Having disclosed my invention, what I claim as new and to be secured by Letters Patent of the United States is:

1. A method of automatically milking animals, which comprises the steps of automatically placing teat cups on the teats of the animal being milked by a milking robot, milking the animal so that milk received in each teat cup from an udder quarter of said animal is discharged separately into a collector element, analyzing the milk flowing from said udder quarters through said teat cups into said collection element separately to detect illness in the relevant udder quarter, measuring milk flow from said udder quarters through said teat cups into said collector element separately to ascertain whether a threshold value has been met wherein the milk flow is such that in the absence of a detection of illness in a said relevant udder quarter then the milking of said relevant udder quarter should be terminated and when illness in said relevant udder section has been detected continuing to receive milk from said relevant udder quarter after the milk flow therefrom is less than said threshold value until said relevant udder quarter is automatically further stripped by the automatic milking thereof.

2. A method in accordance with claim 1 comprising automatically identifying each animal of a herd of animals being milked by the method and establishing an individualized threshold value for each animal.

3. A method in accordance with claim 1 wherein said illness comprises mastitis and wherein when the milk flow from the relevant udder quarter has decreased to less than said threshold value, said relevant udder quarter is stripped for a predetermined period of time.

4. A method in accordance with claim 1, wherein the illness detected in said relevant udder quarter is mastitis and after the milk flow from said relevant milk quarter has decreased to below said threshold value, said relevant udder quarter is further stripped until an additional predetermined quantity of milk has thereafter been received from said relevant udder quarter.

5. A method in accordance with claim 1, wherein the illness detected in said relevant udder quarter is mastitis and continuing to strip milk from said relevant udder quarter until the milk flow from said relevant udder quarter has decreased to less than a second threshold value which is lower than said first mentioned threshold value.

6. A method in accordance with claim 5, wherein said second threshold value is a function of the extent to which mastitis had been detected in said relevant udder quarter.

7. A method in accordance with claim 1, wherein each milk line from said teat cup includes a mastitis sensor which transmits data to a computer whereby M is derived in said computer indicating that mastitis has been detected in the relevant udder quarter, a threshold value D is then established in said computer for the milk flow in the milk line connected to said relevant udder quarter which, using the first and second threshold values D1 and D2, is derived in said computer in accordance with the Boolean expression $D=D1.\overline{M}+D2.M$.

8. A method in accordance with claim 7, wherein a milk flow sensor is incorporated in each of the milk lines between said teat cups and said collector element, each said flow sensor transmitting to said computer a signal S indicating the milk flow rate, the milk line for said relevant udder quarter being closed as soon as said computer determines that the milk flow S has decreased to below said threshold value D.

9. A method in accordance with claim 7, wherein for said relevant udder quarter the progression of the milk yielded versus time is recorded in said computer and depending thereon said relevant milk quarter is either (a) stripped further for a predetermined time interval, or (b) stripped further until the milk flow from said relevant udder quarter has decreased to less than said threshold value, D2, which is lower than said first threshold value D1, or (c) stripped further until an additional predetermined quantity of milk has been received from said relevant udder quarter.

10. A method in accordance with claim 7 wherein said mastitis sensors comprise milk conductivity sensors, the milk conductivity in said milk line carrying milk from said relevant udder quarter being compared to milk conductivity based on a progressive weighted or non-weighted average conductivities on previous milking turns of the relevant animal and on the basis of said comparison, ascertaining whether or not milk flowing from said relevant udder quarter has decreased to less than said first threshold value, D1 and when the milk flow has so decreased the milking of said relevant udder quarters will be stopped or if not said relevant udder quarter will be stripped further.

11. A method in accordance with claim 10, wherein said computer, on the basis of said comparison determines said average is exceeded, generates an attention signal that indicates to what extent said average milk conductivity exceeds that currently ascertained in said computer.

12. A method in accordance with claim 11, comprising said computer issuing a command consisting of one of the following: (a) said relevant udder quarter is to be stripped further or (b) said relevant udder quarter is to be stripped further in a subsequent milking turn if it is found that the milk flow from said relevant udder quarter has decreased to less than said first threshold value, D1.

13. A method in accordance with claim 10, wherein the milking of said relevant animal is permitted more times than average in a twenty-four hour period.

14. A method in accordance with claim 1, comprising recording in a computer an average value of a time difference between the moment which the animal reports to a compartment wherein it is automatically milked and the moment of the animal reporting for the previous milking turn in said milking compartment and on the basis of said average value transmitting an attention signal when the relevant animal has not yet reported for the next milking turn and since the animal's last milking turn there has elapsed a period of time which corresponds to more than said average time difference increased by additional time value depending upon the historic spreading for the relevant animal of said average time differences.

15. A method for automatically milking animals which comprises automatically placing teat cups on an animal's teats by means of a robot, milking each of the animal's udder quarters by said teat cups, measuring the milk flow from each of said udder quarters while it is being milked, testing the milk from each of said udder quarters while it is being milked for mastitis and automatically milking the relevant animal more times than average in a twenty-four hour period when mastitis has been detected in that animal.

16. A method in accordance with claim 15, comprising transferring said relevant animal in whom mastitis has been detected to an isolation area.

17. A method of automatically milking animals which comprises automatically identifying each animal when it reports to an area having a milking robot for automatically milking said animals, determining among said animals those in which mastitis has been diagnosed, those which are to be inseminated, those having udders shaped so they cannot be automatically milked, and those whose hoofs must be clipped, and isolating said animals in an isolation area contiguous to the area wherein said animals would be otherwise automatically milked.

18. A method in accordance with claim 17, wherein said animals having a udder shaped whereby they cannot be milked automatically are returned to an area for being milked wherein teat cups are manually connected to teats of such animals.

19. A method in according with claim 17, wherein said animals having udder shapes whereby they cannot be milked automatically are, upon reporting to said area for being milked, guided directly into said isolation area.

20. A method in accordance with claim 17 comprising continuously updating the number of animals transferred from said area for being milked into said isolation area.

21. A method in accordance with claim 20, wherein said the number of animals present in said isolation area is updated by counting means which can be manually overridden, said counting means being proximate a passageway into said isolation area.

22. A method in accordance with claim 17, wherein for said animals in which mastitis has been diagnosed, automatically applying anti-mastitis ointment to the teat of the relevant udder quarter while said animal is in said area for being milked and before said animal is placed in said isolation area.

23. A method of automatically milking animals which comprises automatically placing teat cups on the animals' teats, milking said animals by said teat cups, testing milk flowing from the animals' udder quarters through said teat cups for mastitis and automatically applying anti-mastitis ointment to the teat of the relevant udder quarter when mastitis has been detected in said relevant udder quarter immediately after automatically milking the relevant animal and removing said teat cups from the relevant animal's teats.

24. A method of automatically milking animals in a milking compartment comprising: identifying each animal that presents itself to be milked at said milking compartment by an animal recognition system; recording the time each animal that has been so identified presents itself to said milking compartment in a computer; calculating in said computer the average time difference between successive milkings at said milking compartment of each said identified animal; and delivering an attention signal when a said animal has not presented itself to said milking compartment since it was last milked therein for a period of time which exceeds said average time difference for said animal.

25. An apparatus for automatically milking animals which comprises teat cups, a collector element, a separate line between each of said teat cups and said collector element, a mastitis sensor and milk flow sensor incorporated in at least one of said milk lines, means for neutralizing the vacuum in each of said teat cups, a computer that receives signals from said mastitis sensor and said milk flow sensor, said computer applying a control signal to said means for neutralizing the vacuum of each said teat cup, said control signal being applied selectively to a relevant teat cup when the milk flow in the relevant milk line has decreased to below a mastitis-dependent threshold value that is indicative that the relevant teat has been further stripped or when a predetermined time interval has elapsed after the milk flow has decreased to below a fixed or an udder quarter-dependent threshold value.

26. An apparatus in accordance with claim 25 wherein said milk flow sensors are disposed in each of said milk lines proximate the connections of said milk lines to said collector element.

27. An apparatus in accordance with claim 25 comprising a shut-off element for each said milk line, each said shut-off element being controlled by said computer.

28. An apparatus in accordance with claim 25 comprising a pulsator for producing a pulsating vacuum in each of said teat cups, the operation of said pulsating vacuum for each said teat cup being controlled by said computer whereby the vacuum in said teat cup is neutralized in response to a control signal from said computer which causes ambient atmosphere to be admitted into the pulsation space of the relevant teat cup.

29. An apparatus in accordance with claim 25 comprising a milking robot for automatically connecting said teat cups to the teats of an animal to be milked, said milking robot co-acting with said means for neutralizing the vacuum in said teat cups for automatically disconnecting said teat cups selectively as soon as the milk flow in at least one said milk line has decreased to below a mastitis-dependent threshold value preset in said computer or as soon as a predetermined time interval has elapsed after the milk flow in a selected milk line has decreased to below a fixed or udder quarter-dependent threshold value.

30. An apparatus in accordance with claim 25 wherein said computer is associated with a display screen on which the most relevant data concerning automatically milking said animals and the health conditions of said animals are visibly depicted.

31. An apparatus for automatically milking animals which comprises a milking compartment which includes a milking robot and is arranged for automatic milking, an isolation area contiguous to said milking compartment, a gate between said milking compartment and said isolation area, teat cups, a collector element, a separate line between each of said teat cups and said collector element, a mastitis sensor and a milk flow sensor incorporated in at least one of said teat cups, means for neutralizing the vacuum of each said teat cup, a computer that receives signals from said mastitis sensor and said milk flow sensor, said computer including means for opening and closing said gate, said computer applying a control signal to said means for neutralizing the vacuum of each said teat cup, said control signal being applied selectively to a relevant teat cup when the milk flow in the relevant milk line has decreased to below a mastitis-dependent threshold value or when a predetermined time interval has elapsed after the milk flow has decreased to below a fixed or an udder quarter-independent threshold value.

32. An apparatus for automatically milking animals which comprises a milking compartment arranged for automatically milking said animals, said milking compartment comprising a milking robot and a milking machine, mastitis sensors included in said milking machine, an isolation area contiguous to said milking compartment, an animal passageway between said milking compartment and said isolation area, a gate in said passageway, a computer which is responsive to said mastitis sensors and which controls said gate whereupon when an animal in said milking compartment has been detected to have mastitis, said gate is caused to open by said computer and such animal exits from said milking compartment into said isolation area.

33. An apparatus for automatically milking animals comprising a milking compartment arranged for automatically milking said animals and including a milking robot, animal identification means at said milking compartment, milk quality detection means at said milking compartment, an isolation area contiguous to said milking compartment, a passageway from said milking compartment into said isolation area and a gate in said passageway controlled by a computer that identifies the animal in said milking compartment, said animal identification means transmitting data to said computer, said milk quality detection means transmitting data to said computer, said computer controlling said gate selectively to transfer animals from said milking compartment to said isolation area via said passageway based on data received by said computer from said milk quality detector and said animal identification means.

34. An apparatus in accordance with claim 33 comprising a pasture contiguous with said isolation area and a further passageway having a further gate from said isolation area to said pasture, computer control means controlling said further gate for permitting selected animals in said isolation area to exit therefrom into said pasture.

35. An apparatus in accordance with claim 34 wherein said data transmitted from said animal identification means to said computer includes data which identifies animals in said isolation area that cannot be milked by said milking robot, said computer controlling said further gate to retain said animals in said isolation area that cannot be milked by said milking robot during periods of time when it is inconvenient to milk such animals with manual assistance.

36. An apparatus for automatically milking animals which comprises a milking compartment arranged for automatically milking said animals and including a milking robot, animal identification means, a computer which receives data from said animal identification means and a passageway into said milking compartment having a gate which is controlled by said computer, said animal identification means identifying animals presenting themselves to said passageway for entry into said milking compartment and transmitting the identity of said animals to said computer, said computer being programmed to identify animals which cannot be milked in said milking compartment without manual assistance, said computer controlling said gate to prevent animals that cannot be milked without manual assistance from entering said milking compartment at preset times which are inconvenient for providing manual assistance to milk such animals.

37. An apparatus for automatically milking animals comprising a milking compartment arranged for milking said animals and including a milking robot, an animal identification means, an animal removal means for facilitating the removal of said animals from said milking compartment, control means for said animal removal means which is controlled by a computer, said animal identification means identifying animals which have entered said milking compartment that require manual assistance to be milked and transmitting information of said entry to said computer, said computer activating said animal removal means whereby animals, which have been identified as requiring manual assistance to be milked are removed from said milking compartment when they have entered said milking compartment at times, recorded in said computer, which are inconvenient to provide manual assistance for milking such animals.

38. An apparatus in accordance with claim 37 comprising alarm means actuated in said milking compartment when said robot does not succeed in connecting teat cups to the teats of an animal therein, means for putting said alarm means out of operation which is actuated during periods of time when it is inconvenient to provide manual assistance to animals that cannot be milked without manual assistance.

39. An apparatus in accordance with claim 37 comprising an isolation area into which animals received in said milking compartment that have been identified as animals that cannot be milked without manual assistance are transferred by said removal means, counting means for counting the number of animals present in said isolation area and manually up-dating means for said counting means for manually up-dating the number of said animals in said isolation area.

40. An apparatus in accordance with claim 39 comprising computerized display means for displaying the number of animals determined by said counting means to have entered said isolation area from said milking compartment.

41. An apparatus for automatically milking animals comprising teat cups, a milking robot for automatically connecting and disconnecting said teat cups to the animals being milked, a collector element, a separate line between each of said teat cups and said collector element, a mastitis sensor and a milk flow sensor incorporated in at least one of said milk lines, said milking robot including anti-mastitis ointment application means for apply anti-mastitis ointment to an udder quarter wherein said mastitis sensor has sensed mastitis, means for neutralizing the vacuum in each of said teat cups, a computer that receives signals from said mastitis sensor and said milk flow sensor, said computer applying a control signal to said means for neutralizing the vacuum of each said teat cup said control signal being applied selectively to a relevant teat cup when the milk flow in the relevant milk line has decreased to below a mastitis-dependent threshold value or when a predetermined time interval has elapsed after the milk flow has decreased to below a fixed or an udder quarter-dependent threshold value.

42. An apparatus for automatically milking animals comprising a milking machine which includes a milking robot for automatically connecting and disconnecting teat cups to the teats of an animal to be milked, mastitis sensors for sensing mastitis in an udder quarter of an animal being milked, said milking robot including anti-mastitis ointment application means which applies anti-mastitis ointment automatically to the relevant udder-quarter wherein said mastitis sensor has sensed the presence of mastitis.

43. An apparatus for automatically milking animals comprising a computer, a milking robot, a set of teat cups carried by said milking robot to be automatically connected and disconnected from the teats of the animal being milked, a milk line for carrying milk from each said teat cup, a collector element for collecting said milk separately from each said milk line, a mastitis detector and a milk flow detector in each said milk line connected to said computer, an animal identification means for identifying animals being automatically milked by the apparatus, a data file for each animal to be milked by the apparatus stored in said computer which is up-dated each time an animal identified by said animal identification means is automatically milked by the apparatus, a display screen associated with said computer in the vicinity of the apparatus for visibly depicting said data files.

* * * * *